(12) United States Patent
Chaurasiya et al.

(10) Patent No.: US 11,797,178 B2
(45) Date of Patent: Oct. 24, 2023

(54) SYSTEM AND METHOD FOR FACILITATING EFFICIENT MANAGEMENT OF DATA STRUCTURES STORED IN REMOTE MEMORY

(71) Applicant: Hewlett Packard Enterprise Development LP, Houston, TX (US)

(72) Inventors: Ramesh Chandra Chaurasiya, Bangalore (IN); Sanish N. Suresh, Bangalore (IN); Clarete Riana Crasta, Bangalore (IN); Sharad Singhal, Belmont, CA (US); Porno Shome, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/377,777

(22) Filed: Jul. 16, 2021

(65) Prior Publication Data
US 2023/0019758 A1    Jan. 19, 2023

(51) Int. Cl.
*G06F 3/06* (2006.01)
*G06F 13/28* (2006.01)

(52) U.S. Cl.
CPC .......... *G06F 3/0604* (2013.01); *G06F 3/0631* (2013.01); *G06F 3/0673* (2013.01); *G06F 13/28* (2013.01); *G06F 2213/28* (2013.01)

(58) Field of Classification Search
CPC ..... G06F 3/0604; G06F 3/0631; G06F 3/0673
See application file for complete search history.

(56) References Cited

U.S. PATENT DOCUMENTS

| | | | | |
|---|---|---|---|---|
| 9,535,849 B2* | 1/2017 | Kegel | .................. | G06F 12/1081 |
| 11,327,889 B2* | 5/2022 | Gerphagnon | ........... | G06F 12/08 |
| 11,533,337 B2* | 12/2022 | Monni | .................. | H04L 63/166 |
| 2009/0063665 A1* | 3/2009 | Bagepalli | ............. | H04L 63/0428 |
| | | | | 710/100 |
| 2021/0117360 A1* | 4/2021 | Kutch | .................... | G06F 9/5083 |
| 2021/0165606 A1* | 6/2021 | Blagodurov | ........ | G06F 13/1663 |

(Continued)

OTHER PUBLICATIONS

Aguilera et al., "Designing Far Memory Data Structures: Think Outside the Box", Proceedings of the Workshop on Hot Topics in Operating Systems, May 2019, 7 pages.

(Continued)

*Primary Examiner* — Charles Rones
*Assistant Examiner* — Alexander Vinnitsky
(74) *Attorney, Agent, or Firm* — Trop, Pruner & Hu, P.C.

(57) ABSTRACT

A system and method are provided for facilitating efficient management of data structures stored in remote memory. During operation, the system receives a request to allocate memory for a first part in a data structure stored in a remote memory associated with a compute node in a network. The system pre-allocates a buffer in the remote memory for a plurality of parts in the data structure and stores a first local descriptor associated with the buffer in a local worker table stored in a volatile memory of the compute node. The first local descriptor facilitates servicing future access requests to the first and other parts in the data structure. The system stores a first global descriptor for the buffer in a shared global table stored in the remote memory and generates a first reference corresponding to the first part, thereby facilitating faster traversals of the data structure.

19 Claims, 10 Drawing Sheets

(56) References Cited

U.S. PATENT DOCUMENTS

2021/0200674 A1\* 7/2021 Sadhu ............... G06F 12/0646
2022/0147316 A1\* 5/2022 Rhisheekesan ..... G06F 9/30109

OTHER PUBLICATIONS

Brock et al., "BCL: A Cross-Platform Distributed Container Library", Computer Science, Distributed, Parallel, and Cluster Computing, CoRR, abs/1810.13029, Apr. 2019, 13 pages.

Cai et al., "Efficient Distributed Memory Management with RDMA and Caching", Proceedings of the VLDB Endowment, vol. 11, No. 11, Jul. 2018, pp. 1604-1617.

Carter J.B., "Design of the Munin Distributed Shared Memory System", Journal of Parallel and Distributed Computing, vol. 29, No. 2, Sep. 1995, 21 pages.

Dragojevic et al., "FaRM: Fast Remote Memory", Proceedings of the 11th USENIX Conference on Networked Systems Design and Implementation, Apr. 2014, pp. 401-414.

Dragojevic et al., "No. Compromises: Distributed Transactions with Consistency, Availability, and Performance", Proceedings of the 25th Symposium on Operating Systems Principles, Oct. 2015, pp. 54-70.

Gen-Z, "Gen Z Consortium: Computer Industry Alliance Revolutionizing Data Access", available online at <https://web.archive.org/web/20200408112428/https://genzconsortium.org/>, Apr. 8, 2020, 4 pages.

Github, "OpenFAM/OpenFAM: OpenFAM Reference Implementation", available online at <https://web.archive.org/web/20201211125630/https://github.com/OpenFAM/OpenFAM>, Dec. 11, 2020, 5 pages.

GRPC, "Why gRPC", available online at <https://web.archive.org/web/20200304060348/https://grpc.io/>, Mar. 4, 2020, 2 pages.

Hsieh et al., "Accelerating Pointer Chasing in 3d-Stacked Memory: Challenges, Mechanisms, Evaluation", 34th International Conference on Computer Design (ICCD), IEEE, Oct. 2016, pp. 1-8.

Kalia at al., "Using RDMA Efficiently for Key-Value Services", Proceedings of the 2014 ACM conference on SIGCOMM, Aug. 2014, pp. 295-306.

Kalia et al., "FaSST: Fast, Scalable and Simple Distributed Transactions with Two-Sided (RDMA) Datagram RPCs", 12th USENIX Symposium on Operating Systems Design and Implementation, USENIX Association, Nov. 2016, pp. 185-201.

LIBFABRIC, "OpenFabrics", Libfabric Programmer's Manual, available online at <https://web.archive.org/web/20200806104428/https://ofiwg.github.io/libfabric/>, Aug. 6, 2020, 3 pages.

Wei et al., "Deconstructing RDMA-enabled Distributed Transactions: Hybrid is Better!", 13th USENIX Symposium on Operating Systems Design and Implementation, USENIX Association, Oct. 2018, pp. 233-251.

Weisz et al., "A Study of Pointer-Chasing Performance on Shared-Memory Processor—FPGA Systems", Proceedings of the 2016 ACM/SIGDA International Symposium on Field-Programmable Gate Arrays, Feb. 2016, pp. 264-273.

\* cited by examiner

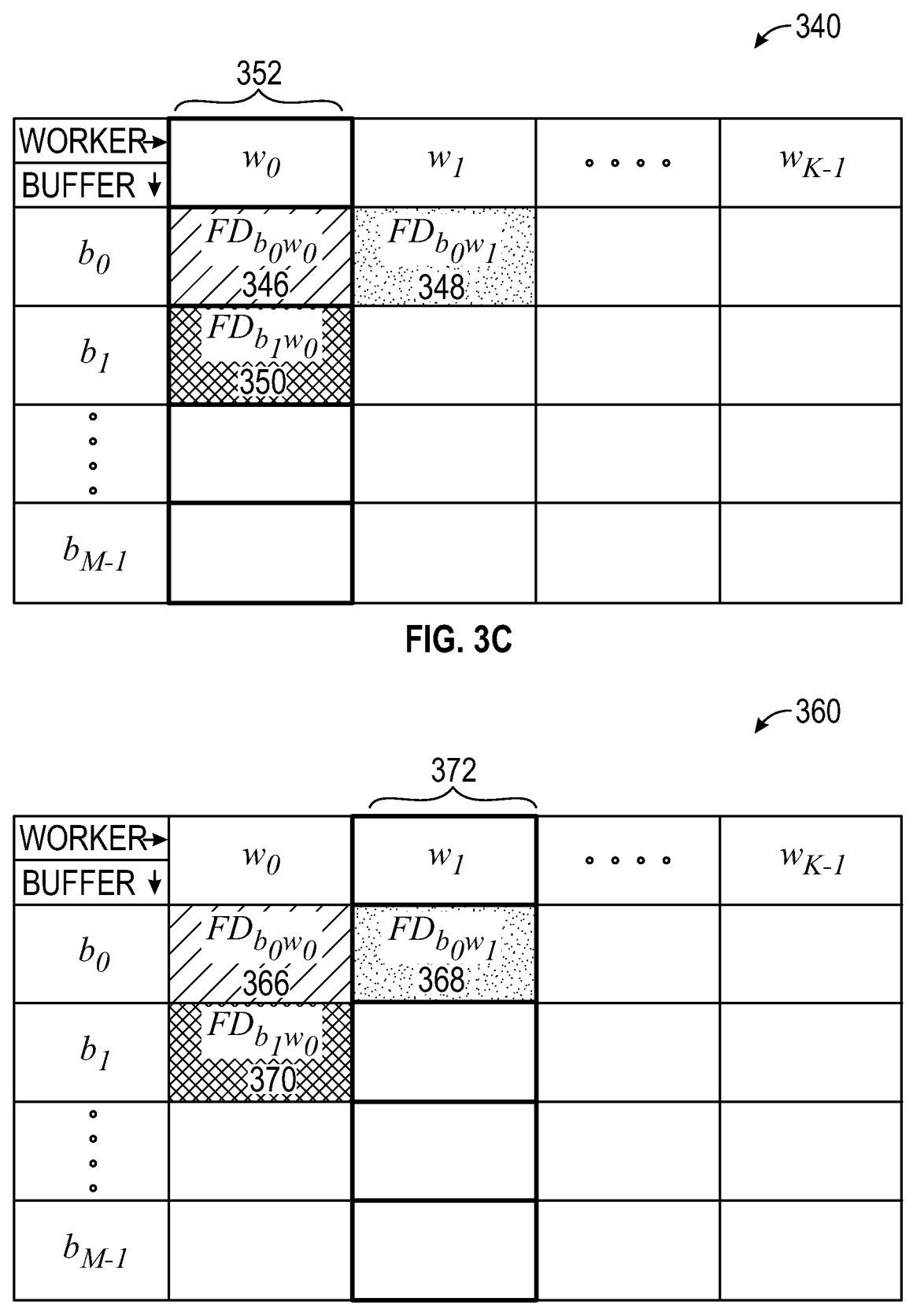

| WORKER → BUFFER ↓ | $w_0$ | $w_1$ | ∘ ∘ ∘ ∘ | $w_{K-1}$ |
|---|---|---|---|---|
| $b_0$ | $FD_{b_0 w_0}$ 346 | $FD_{b_0 w_1}$ 348 | | |
| $b_1$ | $FD_{b_1 w_0}$ 350 | | | |
| ⋮ | | | | |
| $b_{M-1}$ | | | | |

FIG. 3C

| WORKER → BUFFER ↓ | $w_0$ | $w_1$ | ∘ ∘ ∘ ∘ | $w_{K-1}$ |
|---|---|---|---|---|
| $b_0$ | $FD_{b_0 w_0}$ 366 | $FD_{b_0 w_1}$ 368 | | |
| $b_1$ | $FD_{b_1 w_0}$ 370 | | | |
| ⋮ | | | | |
| $b_{M-1}$ | | | | |

FIG. 3D

SYSTEM AND METHOD FOR FACILITATING EFFICIENT MANAGEMENT OF DATA STRUCTURES STORED IN REMOTE MEMORY

BACKGROUND

Field

This disclosure is generally related to memory management. More specifically, this disclosure is related to a system and method for facilitating efficient management of data structures stored in remote memory.

Related Art

The proliferation of internet and e-commerce continues to create a vast amount of digital content. Various distributed storage systems have been created to access and store such digital content. However, the exponential growth of digital content can overwhelm traditional storage system architectures. Increasing memory capacity can be an option to accommodate such digital content.

A multi-processor system can include a plurality of processors interconnected via communication links for providing a cost-effective and high-speed computing environment. The multi-processor systems can include a group of memory devices attached to the processors. Each processor can be attached to a plurality of caches to provide increased computing power and speed.

Additionally, the multi-processor system can provide access to remote memory, e.g., Fabric Attached Memory (FAM), which can be enabled through technologies like Remote Direct Memory Access (RDMA) over fast interconnects, e.g., Infiniband, Ethernet, etc. Although FAM provides a number of advantages, e.g., a large memory capacity through disaggregation, persistent memory, improved availability, separate fault domains for FAM, and improved data sharing among processors, FAM incurs a higher latency than dynamic random access memories (DRAMs) attached to processors in the multi-processor system. This is because the traditional data structures resident in and designed for DRAMs are poorly suited for FAM as they incur large access latencies over the interconnects; and include additional overhead for metadata operations, e.g., look-ups, memory allocations, and permission checks. Therefore, there exists a number of challenges involved with applying a data structure designed for DRAM on a FAM.

BRIEF DESCRIPTION OF THE FIGURES

FIG. 3C shows an example local worker table in DRAM that is associated with a first worker process, according to one embodiment of the present disclosure.

FIG. 3D shows an example local worker table in DRAM that is associated with a second worker process, according to one embodiment of the present disclosure.

In the figures, like reference numerals refer to the same figure elements.

DETAILED DESCRIPTION

Figure 1:
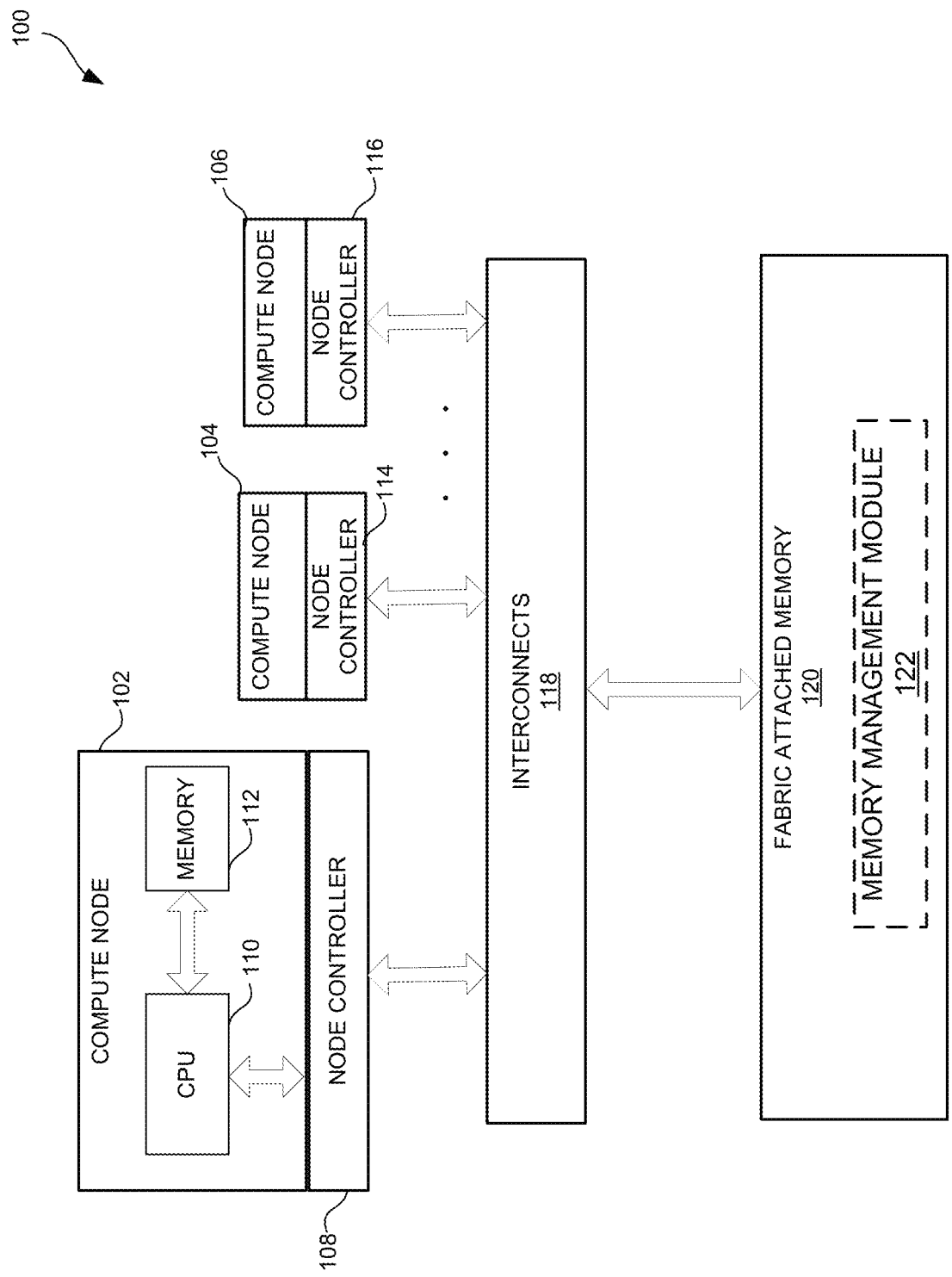
FIG. 1 illustrates an exemplary system architecture of a memory management system, according to one embodiment of the present disclosure.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

The embodiments described herein solve the technical problem of efficiently managing data structures stored in FAM. Specifically, a system and method are provided that can implement a novel memory allocator for allocating memory in FAM to enable efficient use of FAM or remote memory over a RDMA fabric. The system can apply the novel memory allocator to store metadata associated with the data structure, i.e., the data structure in FAM, in DRAM, thereby enabling faster access to FAM and efficient use of FAM.

In existing multi-processor systems although including FAM can provide a number of advantages, migrating the existing data structures resident in DRAM and designed for DRAM to the FAM can be result in additional latency. Specifically, performing memory operations in FAM with the data structures designed for DRAM can incur larger latency when compared to that in processor attached memories, e.g., DRAM. In other words, the data structures designed for DRAM are poorly suited for FAM as they incur large access latencies over the interconnects; and include additional overhead for metadata operations, e.g., look-ups, memory allocations, and permission checks.

Moreover, since memory devices can be often accessed through high-level data structures, e.g., hash tables, trees, and queues, the existing data structures were designed to provide efficient and fast access to memory. These data structures when implemented in the FAM can involve multiple round trips across the fabric for performing data structure traversals; and address translations from FAM global addresses to node local addresses can result in increased latency. Furthermore, memory operation in FAM can involve 128-bit atomic operations and the underlying fabric may support 64-bit atomic operations, in such cases the 128-bit atomic operations are emulated, thereby adding to the cost of the operations. Therefore, the data structures designed for DRAM may be ill-suited for FAM.

To overcome the above-mentioned problems, some of the embodiments described in the present disclosure provide a novel approach to optimize data structure traversals while providing efficient data sharing capabilities. Specifically, the system provides a novel memory allocator and associated algorithms for allocating remote memory to enable efficient use of the remote memory over an RDMA fabric. The novel memory allocator can store local metadata structures in DRAM to maintain metadata for faster traversals of the FAM resident data structures. Furthermore, the system can facilitate 64-bit atomic operations in FAM, thereby eliminating the expensive emulation of 128-bit atomic operations.

The term "fabric" refers to a network of communication links used for interconnecting a plurality of nodes, with each node optimally coupled to every other node via the communication links. Each node can include one or more processors, node controllers, memory bank(s), and other components.

The phrases "remote memory" and "Fabric Attached Memory" are used interchangeably in this disclosure.

The term "slot" refers to a block of memory for storing data within a buffer. A buffer can include a plurality of such blocks or slots. The term "slot" and "block" are used interchangeably in this disclosure.

System Architecture

FIG. 1 illustrates an exemplary system architecture of a memory management system, according to one embodiment of the present disclosure. In the example shown in FIG. 1, system 100 can include a plurality of compute nodes 102-106, with each compute node including central processing unit (CPU) 110 socket which can represent a processor group. A processor group can include one or more processors housed in a CPU socket. For simplicity, CPU socket 110 is considered to represent one processor.

Processor 110 in each compute node can be coupled to a corresponding node controller, e.g., node controllers 108, 114, and 116 are coupled to processors in corresponding compute nodes 102, 104, and 106, respectively, via Ultra Path Interconnect (UPI) links for intra-node traffic. In other words, the UPI links can be used to send UPI traffic within the compute nodes, e.g., to communicate between processor groups 110 and memory 112 attached to the processor groups 110. Furthermore, each processor within a compute node can be coupled to a plurality of memory devices 112, e.g., dynamic random access memory (DRAM), using Double Data Rate (DDR) Dual In-line Memory Module (DIMM) slots. System 100 can also include a node with a fabric attached memory or remote memory 120 to provide additional memory capacity using technologies like a Remote Direct Memory Access (RDMA) over fast interconnects 118, e.g., interconnect 118 can use Gen-Z, Slingshot, Infiniband, or Ethernet. Interconnects 118 can facilitate inter-node traffic across nodes 102, 104, 106, and FAM 120.

FAM 120 provides several advantages, specifically, FAM 120 provides a high memory capacity through disaggregation, i.e., FAM can be decoupled from the memory associated with a compute node in an interconnect network. FAM could be a persistent memory and can provide better availability since there exists separate fault domains for FAM. In other words, when a failure occurs in a compute node, e.g., compute node 102, in the interconnect network, data residing in FAM 120 can continue to be available to other working compute nodes, e.g., compute nodes 104 and 106, in the interconnect network. Furthermore, FAM 120 can provide an enhanced fault resilient data sharing among the processors in the interconnect network, i.e., data structures can be stored in the FAM so that they are fault resilient and can be shared across the compute nodes in the interconnect network.

Processor 110 on compute node 102, can access DRAM 112 with "load" and "store" instructions which are fast because of the low latency of implementing these instructions. However, the interconnects 118, e.g., Infiniband, may not support memory semantics, i.e., direct "load" or "store" instructions, to access FAM 120. In other words, the CPU 110 may not be able to access FAM using memory semantics, i.e., the processors in the compute node may be unable to access FAM in a way that it accesses DRAM. Instead, the fabric may support copy semantics, e.g., RDMA based "get" or "put" instructions, to access FAM. This can further add to the latency involved with accessing FAM.

Furthermore, for accessing FAM 120, i.e., when performing a read or write operation on FAM, processor 110 may first allocate memory in FAM which can result in a two-sided communication. In other words, processor 110 may request a memory management entity or module 122 associated with the FAM node to allocate memory for a data structure; prepare metadata associated with the data structure; and then to request the metadata information. This type of memory allocation in FAM can be slow due to the involvement of two entities in accessing FAM, i.e., memory management entity 122 and a set of application programming interfaces (API's) that are available at the compute node, e.g., compute node 102, for requesting memory allocation and managing memory for a data structure in FAM 120. Memory management module 122 can be a separate memory management service or can be a hardware-based controller included within FAM 120.

Specifically, to allocate memory in FAM for a data structure, compute node 102 may call one of the API's associated with memory allocation to send a memory allocation request to memory management entity 122. In response to receiving the memory allocation request, memory management entity 122 allocates memory in FAM 120 and returns a descriptor. The descriptor can include information regarding the data structure, e.g., an identifier that uniquely identifies the memory allocated in FAM 120, access permissions with respect to the data structure, etc. Compute node 102 may use the descriptor for subsequent access requests directed to the allocated data structure in FAM. For example, if compute node 102 wants to write to the allocated data structure and if a corresponding API is available to perform a read or write operation, the compute node may provide the following as arguments to the API: the descriptor for the data structure, the data to be written, offset information, and other related information.

Each allocation in FAM can be associated with two types of descriptors: a global descriptor and a local descriptor. The global descriptor represents a unique identifier for the memory allocated to data structure in FAM. Whenever a compute node requests access for a FAM data structure, e.g., a radix tree data structure node, it has to first convert the global descriptor to a local descriptor. Such a conversion for each access to a node or a block in a data structure can involve permission checks at FAM 120 which can be slow. The compute node may then use the local descriptor to perform data operations associated with the block in the data structure. Some of the challenges associated with allocating memory and managing a data structure in FAM are described below in relation to FIG. 2.

Figure 2:
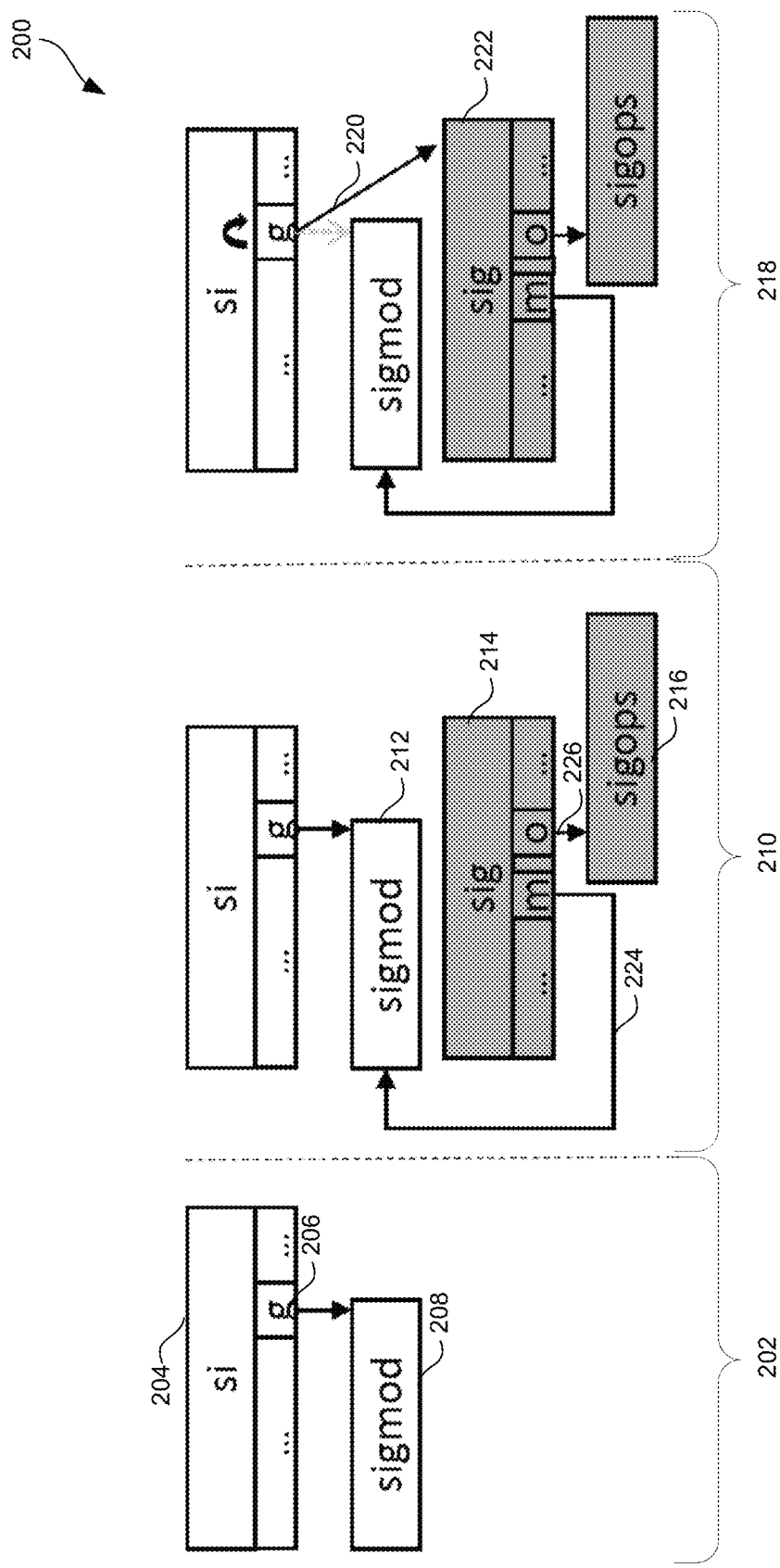
FIG. 2 illustrates an exemplary lockless radix-tree data structure, according to one embodiment of the present disclosure.

FIG. 2 illustrates an exemplary lockless radix-tree data structure, according to one embodiment of the present disclosure. The example data structure 200 shown in FIG. 2, demonstrates some of the challenges involved with applying data structures designed for DRAM in FAM. Data structure 200 can be a lockless radix-tree, with the leaves of the tree representing data and the intermediate nodes corresponding to data prefixes. Such a representation can reduce the size of the tree since the data prefixes can be shared. For example, prefix "si" 204 (in 202 and similarly in 210 and 218) can be shared across data that starts with "si." Child nodes can be used to store further data, e.g., the child with prefix "g" 206 can hold a lead to data that starts with "sig" 208.

Lockless algorithms ensure that concurrent processes perform atomic changes to maintain the tree in a consistent state. Updating lock-free data structure 200 can involve a non-critical section activity and a short critical section activity, which can be accomplished through atomic operations supported by hardware or the underlying fabric. For example, to add a node to the tree, the system may allocate memory for the node and one or more values can be stored outside the critical section. The critical section can include swinging a pointer, e.g., through compare-and-swap (CAS), to add a new element in the tree. Thus, the new element is atomically visible to other concurrent processes, and the lock-free data structure can move from one consistent state to another.

The example shown in FIG. 2, further demonstrates how a new key "sigops" 216 (in data structure or radix-tree 210) can be inserted into radix-tree 210 with an existing node having key "sigmod" 212. To insert new key "sigops" 216 into a radix-tree involves several operations that are illustrated in 202,210, and 218. Specifically, the system may perform the following operations: (a) perform multiple node traversals and pointer chasings to find a right node for insertion, e.g., 202 shows the tree prior to inserting an intermediate node; (b) in response to finding the right node for insertion, dynamically allocate memory for the new key, i.e., "sigops" 216, and a new intermediate node with a common prefix, e.g., "sig" 214; (c) insert pointers, e.g., 224 and 226 shown in radix-tree 210, to the children nodes associated with the new intermediate node; (d) perform a CAS operation to atomically switch the pointer 220 in the original parent node, i.e., switching the pointer from node with key "si" to the new intermediate node with key "sig" 222 in radix-tree 218. In the above-mentioned operations (a)-(c) are non-critical section operations while operation (d) is a critical section atomic operation.

For DRAM resident data structures, the operations (a)-(d) can be relatively fast whereas for FAM resident data structures several challenges are involved. Specifically, pointer traversals in FAM may require multiple round trips across the fabric and can involve address translations from FAM global addresses to compute node local addresses. In addition, since the metadata associated with the FAM resident data structure is stored in FAM, the compute nodes may have to access the metadata for every data structure traversal. Further, performing dynamic FAM allocation can incur significant overhead to the performance of FAM resident lockless radix-tree data structures.

Moreover, while performing dynamic FAM allocation the system may require to co-ordinate with an entity external the local node, e.g., a FAM memory server or a memory manager, which can cause the dynamic FAM allocation operation to be a computationally expensive operation. In addition, the underlying fabric, e.g., Infiniband interconnect, may not support 128-bit atomic operations in FAM. In such a case, the system may have an additional burden to emulate the 128-bit atomic operations which can further add to the cost of the operations in terms of latency, resource utilization, and computational complexity.

Other types of tree operations in the FAM, e.g., "find" and "delete," can involve similar tree traversals, address conversions, and atomic updates. Therefore, these tree operations in FAM can contribute to the slow performance of the data structure in FAM, whereas a similar radix-tree implementation of the data structure in DRAM has a faster performance. Since implementing data structures in FAM that were designed for DRAM degrades the performance of FAM, designing data structures that are suited for FAM can improve the performance of FAM while preserving the benefits of using FAM in an interconnect network.

Some of the embodiments described herein solve the above-mentioned problems associated with the overhead due to memory allocation of small blocks of memory corresponding to the parts or blocks of the data structure, e.g., nodes in the radix-tree; and the overhead associated with traversing data structures through "pointer-chasing." In the following paragraphs, the designing of FAM specific data structures and how they overcome some of the above-mentioned problems are described in relation to FIGS. 3-6.

Metadata associated with the data structure in FAM can include information about the location of the allocated data structure nodes in FAM, size of the data structure nodes, offset associated with each data structure node, permission information, etc. Since most of the metadata information associated with the data structure in FAM is immutable, i.e., the metadata does not change dynamically, the metadata can be consistently cached in the compute nodes. Such caching of the metadata in the compute nodes can significantly reduce the latency associated with accesses across the fabric. Furthermore, since memory allocation for the data structures may involve expensive remote procedure calls, the system may consolidate memory allocations to reduce the corresponding overhead. In addition, by designing metadata structures that can facilitate efficient accesses to FAM, the large number of atomic operations over the fabric can be reduced.

In one embodiment, the system may create a per-worker allocation of memory for a radix-tree (or tree-based data structure) that can be accessible through certain metadata structures. A worker can be a concurrent process that accesses the radix-tree and performs operations on the nodes in the radix-tree. One or more compute nodes in the interconnect network may include a FAM Heap Allocator (FHA) to pre-allocate a large buffer in FAM when initializing a worker.

Figure 3A:
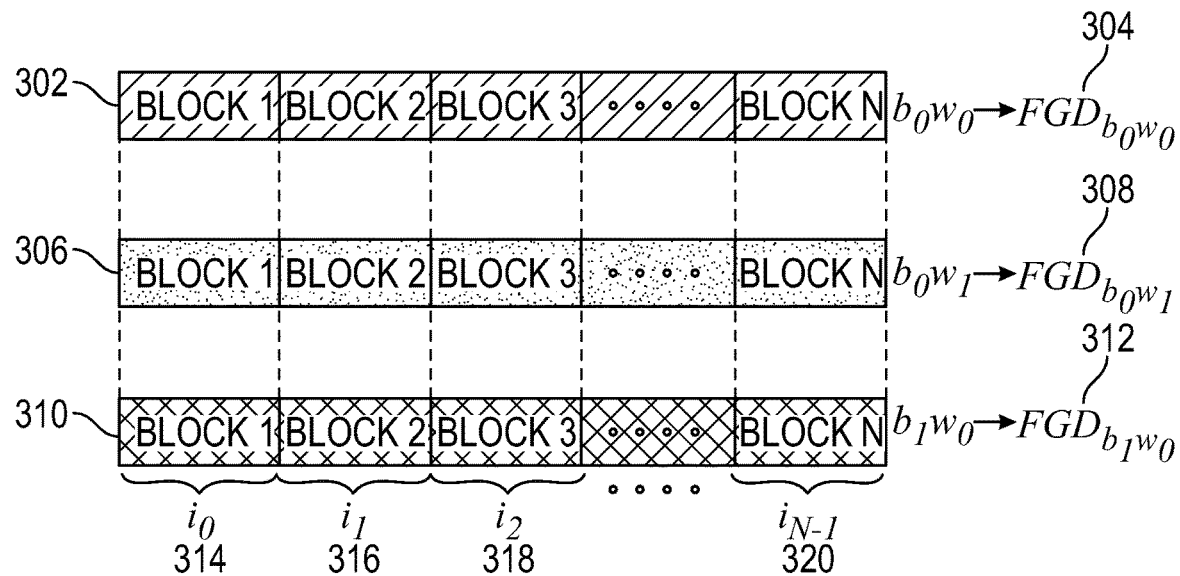
FIG. 3A shows an exemplary allocation of buffers in a FAM, according to one embodiment of the present disclosure.

FIG. 3A shows an exemplary allocation of buffers in a FAM, according to one embodiment of the present disclosure. FIG. 3A shows an example of three large buffers that the FHA pre-allocates in FAM for different workers. Each buffer can represent a heap that can be used for allocation of data structure nodes in the future. Therefore, instead of allocating small blocks of memory for each data structure node, the FHA can allocate a large buffer upfront for a plurality of nodes in the data structure. Hence, when a worker process associated with a compute node in the interconnect network sends a request to access a data structure node, the system may allocate a slot in the pre-allocated buffer to a data structure node. Such pre-allocation of buffers can significantly reduce the overhead due to multiple round trips across the fabric.

In FIG. 3A, the buffers, i.e., 302, 306, and 310, allocated for different workers, i.e., $w_0$ and $w_1$, are indicated by different line patterns. The FHA may reserve for worker "0" a large FAM resident buffer 302 which is indicated by $b_0w_0$ for several radix-tree nodes. Similarly, FHA may reserve for worker "1" a large FAM resident buffer 306 which is indicated as $b_0w_1$. Each FAM resident buffer can be uniquely identified by an address in FAM and this address can be a FAM Global Descriptor (FGD). For example, an address associated with buffer 302 can be denoted as $FGD_{b_0w_0}$ (304), an address associated with buffer 306 can be denoted as $FGD_{b_0w_1}$ (308), and an address associated with buffer 310 can be denoted as $FGD_{b_1w_0}$ (312). The FGDs remain the same across all the data structure nodes associated with a specific buffer. Each buffer may include a number of fixed sized indexed slots (or memory blocks, e.g., block 1-block N indexed as 314-320, respectively) which are reserved for different nodes in the radix-tree and can be used later as and when data structure nodes are added. When all the slots in the buffer, e.g., buffer 302, are consumed, FHA may create or pre-allocate a new buffer, e.g., buffer 310, for worker "0," and worker "0" may continue to use new buffer 310 for processing new node allocation requests. Therefore, with the pre-allocation of large buffers, the system can eliminate expensive remote procedure calls (RPCs) for performing small dynamic allocations, i.e., RPCs for allocating every individual block or slot, and co-ordination with an external memory management entity.

Figure 3B:
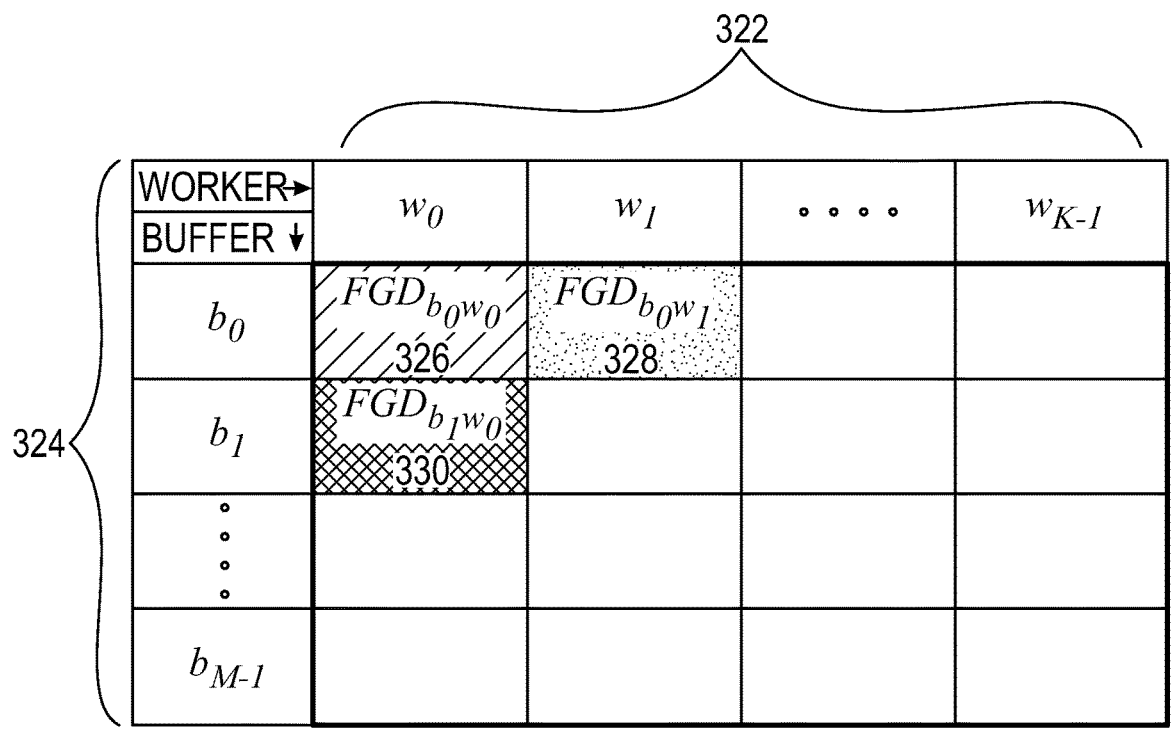
FIG. 3B shows an example of a shared global table in FAM, according to one embodiment of the present disclosure.

Whenever the FHA allocates a new buffer for a worker, FHA may store the FGD in a shared global table in FAM. FIG. 3B shows an example of a shared global table in FAM, according to one embodiment of the present disclosure. In the example shown in FIG. 3B, the shared global table represents a two-dimensional array with the rows indexed by a buffer identifier $b_x$ (324) and the columns indexed by a worker identifier $w_x$ (322), where x is a monotonically increasing number starting from "0." For example, the $FGD_{b_0w_0}$ for buffer 302 (in FIG. 3A) is stored as 326 in the shared global table, the $FGD_{b_0w_1}$ for buffer 306 is stored as 328, and the $FGD_{b_1w_0}$ for buffer 310 is stored as 330 in the shared global table. In other words, the FHA can create and maintain a mapping between the allocated buffers in FAM and the corresponding FGD in the shared global table in FAM.

Further, since each column in the shared global table is dedicated to a different worker, a write-write conflict between workers does not occur in the table entries. In other words, each worker "owns" the column indexed by its worker identifier for the purpose of writing and no other worker can write to that column. However, each worker can read columns owned by other workers. The design of the shared global table can simplify the co-ordination and synchronization between different worker processes. This is because the shared global table has a separate row representing a per-worker buffer and has worker specific columns. Further, multiple worker processes can access the shared global table, meaning that the system can allow multiple read requests to the shared global table simultaneously.

The shared global table can act as a look-up for retrieving the FGD for a worker's buffer. Further, since the FGD for a buffer does not change, the mapping maintained in the shared global table is immutable. Therefore, the shared global table can be visible to the compute nodes in the interconnect network.

In addition to storing the FGDs in the shared global table, the system or FHA (hereafter the terms "system" and "FHA" are used interchangeably) may also store FAM descriptors (FD's) which represent compute node local addresses corresponding to the FGD in a local worker table in DRAM, and the FD's may be different on different compute nodes. In one embodiment, the system may convert the FGD's to their corresponding FD's and can cache them in a local worker table associated with a respective compute node in the interconnect network. The FGD's associated with buffers, i.e., 302, 306, and 310 in FIG. 3A, are stored in a shared global table in FAM and the corresponding FD's (which are different for each node due to address translation involved) are stored in DRAM tables, i.e., local worker table, at each node. Whenever the system allocates a new buffer for a worker process associated with a compute node, the system may simultaneously update the shared global table with the new buffer's FGD and can update the corresponding DRAM table at the compute node with the new buffer's FD.

FIG. 3C shows an example local worker table in DRAM that is associated with a first worker process, according to one embodiment of the present disclosure. A local worker table represents a two-dimensional array with the rows indexed by a buffer identifier $b_x$ and the columns indexed by a worker identifier $w_x$, where x is a monotonically increasing number starting from "0." In the example shown in FIG. 3C, the entries in local worker table 340 represents a state after a couple of FAM access requests or operations. Local worker table 340 can represent a first worker process associated with a first compute node. Therefore, FHA may first populate column 352 in local worker table 340, this is because first column 352 corresponds to the first worker process $w_0$. In other words, whenever the FHA allocates a buffer, e.g., buffer $b_0$, for worker process $w_0$, a corresponding FGD is stored in the shared global table as $FGD_{b_0w_0}$ and a $FD_{b_0w_0}$ is stored in cell 346 in local worker table 340. The local worker table 340 also includes a cell 350 containing $FD_{b_1w_0}$ and a cell 348 containing $FD_{b_0w_1}$. The worker process $w_0$ may only be aware of the buffers allocated for its operations and may not be aware of buffers allocated for other worker processes.

Given that the system has allocated a buffer to hold information about several radix-tree nodes, the system can locate these nodes in FAM through just one FGD or FD. In other words, after the system has stored the FD corresponding to FGD in DRAM, the system may avoid converting the FGD to FD for the plurality of nodes in the buffer in the subsequent accesses to the buffer to retrieve any information from FAM corresponding to the FGD. Therefore, storing the FD's for the corresponding FGD's in DRAM can significantly reduce the overheads due to the expensive remote procedure calls. In addition, since FGD's are immutable, no co-ordination among the worker (or compute node) DRAM tables are required and DRAM table entries may not become stale.

FIG. 3D shows an example local worker table in DRAM that is associated with a second worker process, according to one embodiment of the present disclosure. In the example shown in FIG. 3D, local worker table 360 represents a state after a couple of FAM access requests or operations. Local table 360 can be representative of a second worker process associated with a second compute node in the interconnect network. Therefore, FHA may first populate column 372 in local table 340, this is because second column 372 corresponds to the second worker process $w_1$. In other words, whenever the FHA allocates a buffer, e.g., buffer $b_0$, for worker process $w_1$, a corresponding FGD is stored in the shared global table as $FGD_{b_0w_1}$ and a $FD_{b_0w_1}$ is stored in cell 368 in local table 360. The worker process $w_1$ may only be aware of the buffers allocated for its operations and may not be aware of buffers allocated for other worker processes.

Now, if worker process $w_1$ tries to access a data structure, worker process $w_1$ may read a root node in the data structure, e.g., the root node may correspond to buffer $b_0$, for worker process $w_0$. Since local worker table 360 may initially populate only column 372, there may be a cache miss for an entry associated with worker process $w_0$ in local worker table 360. In this case, the system may then check the shared global table in FAM to find a FGD corresponding to buffer $b_0$ and worker process $w_0$. The system may convert this FGD, i.e., $FGD_{b_0 w_0}$, to a local descriptor, i.e., $FD_{b_0 w_0}$, and store this local descriptor in local worker table 360 in cell 366. The local worker table 360 also includes a cell 370 containing $FD_{b_1 w_0}$.

In one embodiment, during the creation of the radix-tree, the system may allocate and initialize an adequate memory space for a shared global table. The system may then allocate a space for larger buffers in FAM based on the worker process that desires to insert a radix-tree node. The system may capture the FGD associated with each buffer in the shared global table and may also capture the corresponding FD in the respective local worker tables. After the system has populated the shared global table with the FGDs for different buffers and corresponding worker processes, the system may allow the worker processes to directly access any radix-tree node created with slots or memory blocks within a buffer by using node handles; the system may not require other co-ordination for accessing the radix-tree nodes. Further, when some workers need to access an existing radix-tree, the system may simply initialize and allocate space for a local worker table in DRAM.

Figure 3E:
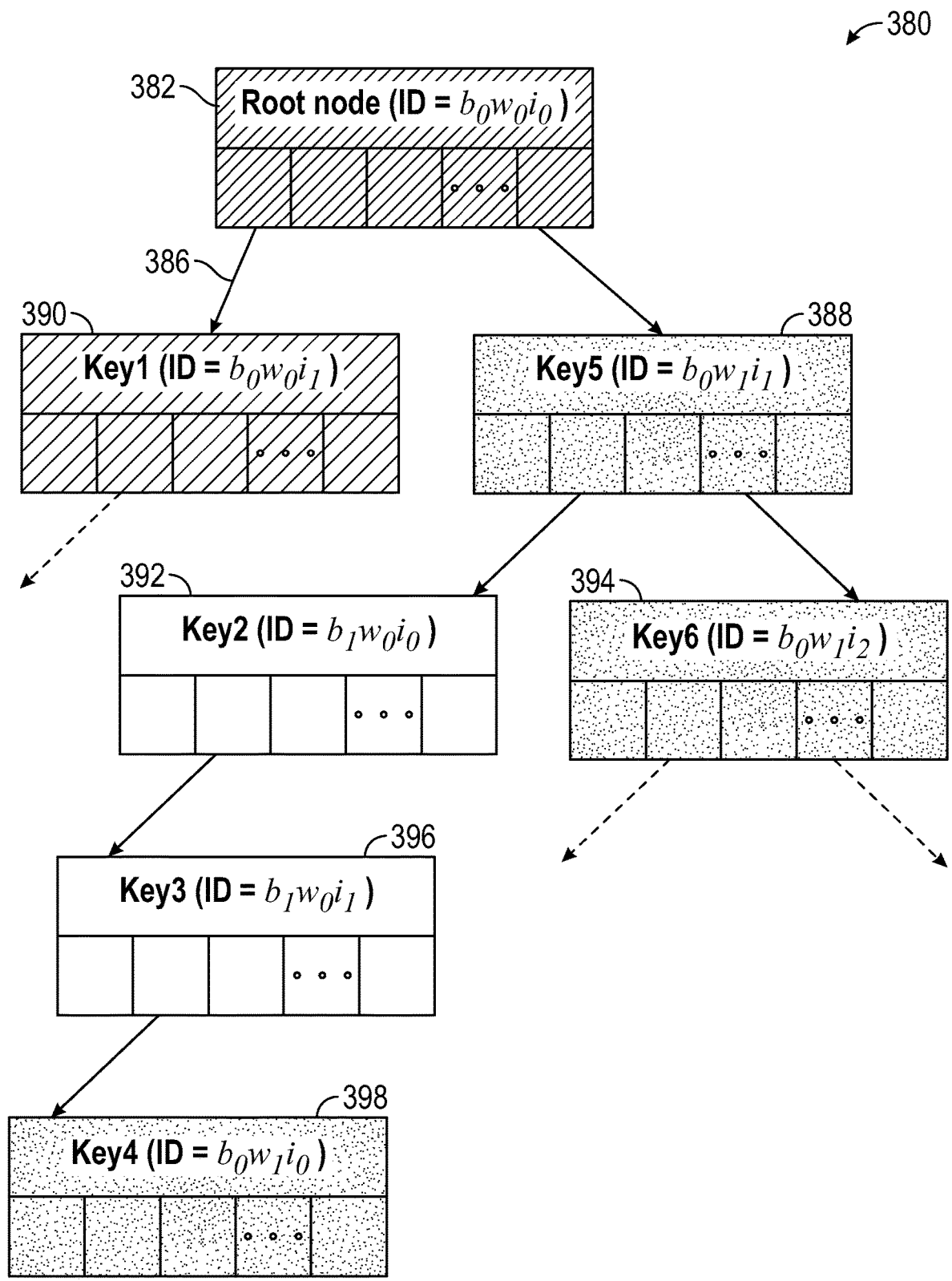
FIG. 3E shows an example data structure in FAM, according to one embodiment of the present disclosure.

FIG. 3E shows an example data structure in FAM, according to one embodiment of the present disclosure. The example shown in FIG. 3E, illustrates a radix-tree data structure 380. As already explained in FIG. 3A, the slots or blocks in each buffer in FAM correspond to the radix-tree nodes. The nodes, e.g., 382, 388, 390, 392, 394, 396, and 398, in data structure 380 can be referenced with a handle that the system created. The handle (or reference) can be represented as a number which can be a concatenation of three components, i.e., a buffer number $b_x$, the allocator (or worker process number or table column owner number) $w_x$, and a slot (or block) index number $i_x$. In other words, the handle can be denoted as $<b_x, w_x, i_x>$. The handle is not limited to these three components, it may also include certain bits that can be reserved for other use cases.

The handle $<b_x, w_x, i_x>$ can be 64-bit in length and this 64-bit handle can be used to identify a radix-tree data structure node in FAM and the critical section operations can be performed with 64-bit atomic operations. In the existing systems, the critical section operations, e.g., modifying pointers between nodes, often involve 128-bit atomic operations that may not be supported by several interconnect network technologies. Therefore, the existing systems may emulate the 128-bit atomic operations which can be expensive in terms of resource usage and computational complexity. Since, some of the embodiments described herein can apply a 64-bit handle $<b_x, w_x, i_x>$ to identify a radix-tree data structure node in FAM, the critical section operations can be performed with 64-bit atomic operations, thereby eliminating the expensive emulated 128-bit atomic operations.

The arrows, e.g., arrow 386, represent links to the other nodes in data structure 380. Each node in data structure 380 has a different identifier, i.e., a different combination of the three components. For example, root node 382 can be referenced with handle $<b_0, w_0, i_0>$, which means that the root node is associated with buffer $b_0$, worker $w_0$, and slot $i_0$. Similarly, a next node 388 in radix-tree data structure 380 can be referenced with handle $<b_0, w_1, i_1>$.

The system may store the handles as next pointers in radix-tree node for enabling traversals of radix-tree data structure 380. When nodes in buffer are deleted, the system may simply mark them as deleted by atomic operations without the need for performing deallocation, and the nodes marked as deleted can be re-used in new node allocations.

During operation, the system may receive a request from worker process $w_0$ to access a node 390 in data structure 380. In response to receiving the request, the system may retrieve a handle for the requested node, i.e., handle $<b_0, w_0, i_1>$, and determine whether an entry exists in the local worker table for worker process $w_0$, e.g., local worker table in FIG. 3A. If an entry is present in the local worker table, then the system may retrieve the corresponding $FD_{b_0 w_0}$ from the local worker table and identify a corresponding global descriptor, i.e., $FGD_{b_0 w_0}$, in the shared global table, e.g., 326 in FIG. 3B. Since every worker process has the local descriptors corresponding to the buffers it has allocated, the local worker table for worker $w_0$ will have an entry for local descriptor $FD_{b_0 w_0}$. Since the local descriptor $FD_{b_0 w_0}$ already exists in the local worker table, the system may not be burdened with an additional operation to convert a global descriptor to a local descriptor, thereby reducing overhead and facilitating faster tree traversals. The system may then calculate, based on the index $i_1$ in the handle $<b_0, w_0, i_1>$, an offset for the node to be accessed and apply the offset to access requested node 390 in data structure 380.

In another example, the system may receive a request from worker process $w_0$ to access a node 388 in data structure 380. In response to receiving the request, the system may retrieve a handle for the requested node, i.e., handle $<b_0, w_1, i_1>$, and determine whether an entry exists in the local worker table for worker process $w_0$, e.g., local worker table in FIG. 3A. If this is the first access request from worker process $w_0$ to access a node associated with another worker process, e.g., worker process $w_1$, then the local worker table for worker process $w_0$ may not have an entry for a local descriptor $FD_{b_0 w_1}$. In such a case, the system may retrieve a global descriptor $FGD_{b_0 w_1}$ from the shared global table in FAM and convert it to a corresponding local descriptor $FD_{b_0 w_1}$. The system may then store this local descriptor in the local worker table for worker process $w_0$. This conversion from the global descriptor to the local descriptor is performed just once. In other words, when the system receives a subsequent access request from worker process $w_0$ for any node allocated for worker process $w_1$, e.g., node 388 or 394, the system may directly access the previously cached local descriptor $FD_{b_0 w_1}$, thereby enabling faster tree traversals.

Figure 4A:
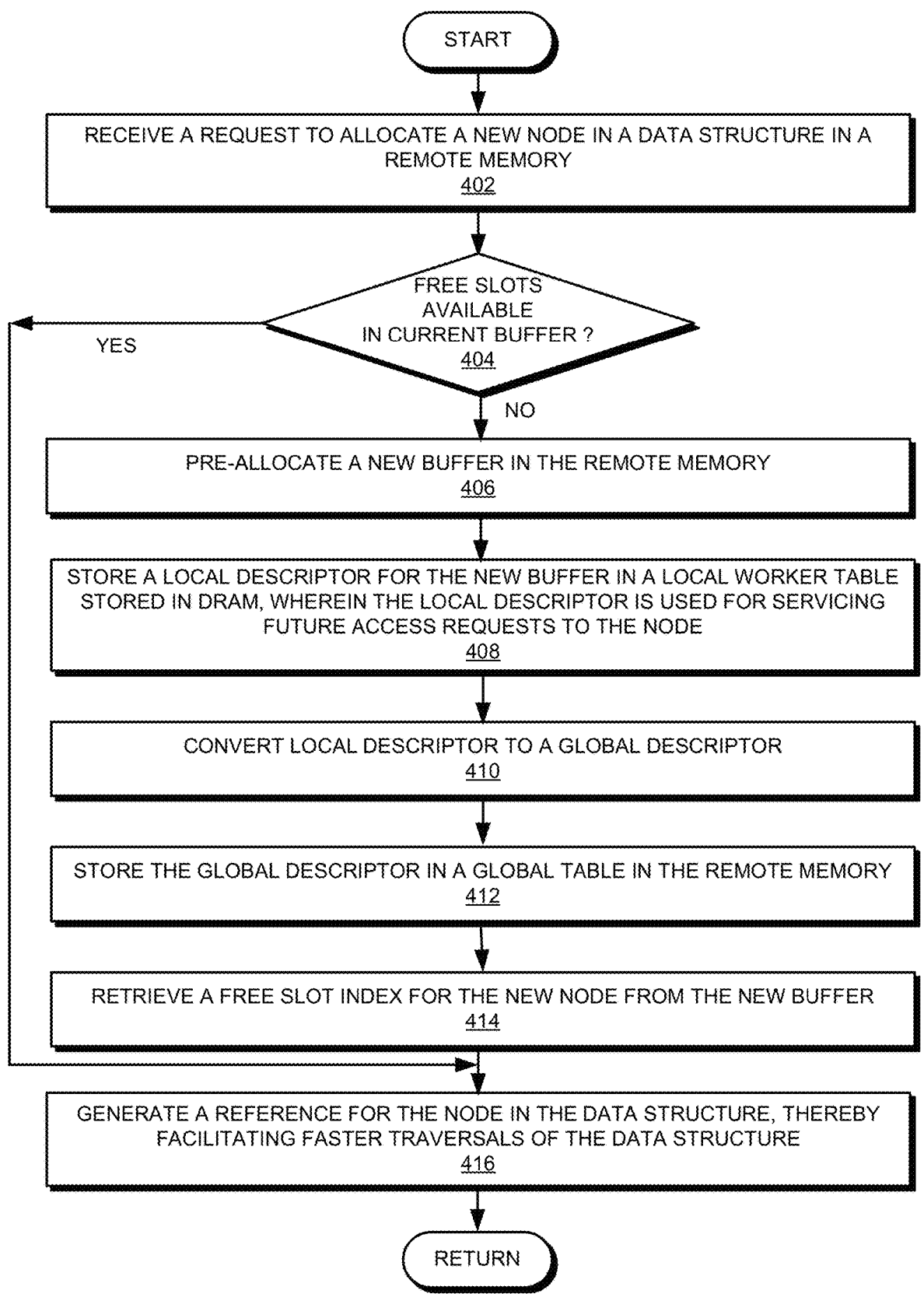
FIG. 4A presents a flowchart illustrating a process for allocating a radix-tree data structure node in FAM, according to one embodiment of the present disclosure.

FIG. 4A presents a flowchart illustrating a process for allocating a radix-tree data structure node in FAM, according to one embodiment of the present disclosure. During operation, the system may receive a request from a worker process in a compute node to allocate a new node in a data structure in a remote memory, e.g., a FAM (operation 402). Prior to allocating the new node, the system may determine whether the current buffer in FAM has free slots available to allocate the new node (operation 404). In one embodiment, the system may store locally in a DRAM associated with a compute node information about the number of slots that are already used in the current buffer and information about the next available free slot in the current buffer. Therefore, the system may not have to access the FAM to determine the availability of free slots in the current buffer.

In response to determining that there are no free slots available in the current buffer, the system may pre-allocate a new buffer in FAM (operation 406). The system may then identify a FD or a local descriptor for the new buffer and store the FD in the DRAM cache associated with a compute node in the interconnect network (operation 408). In other words, the system may store the FD for the new buffer in a corresponding cell in a local worker table in DRAM cache. The system may use the FD associated with the new buffer for subsequent accesses to radix-tree nodes associated with the new buffer. The system can then convert the FD into a FGD for the new buffer (operation 410) and store the FGD in a shared global table in FAM (operation 412). In one embodiment, the system may store the FGD and the FD simultaneously in the shared global table and the local worker table, respectively.

After the system has stored the FGD and the corresponding FD in the shared global table and the local worker table, respectively, the system may retrieve an index for the free slot in the new buffer (operation 414). Based on the index for the free slot, an identifier for the new buffer, and an identifier for the worker process, the system may generate a handle or reference for the new data structure node (operation 416) and the operation returns. The handle can enable 64-bit atomic operations which is supported by several interconnect network technologies, thereby eliminating the need for expensive emulated 128-bit atomic operations. In response to determining that free slots are available in the current buffer (operation 404), the system may continue to operation 416.

Figure 4B:
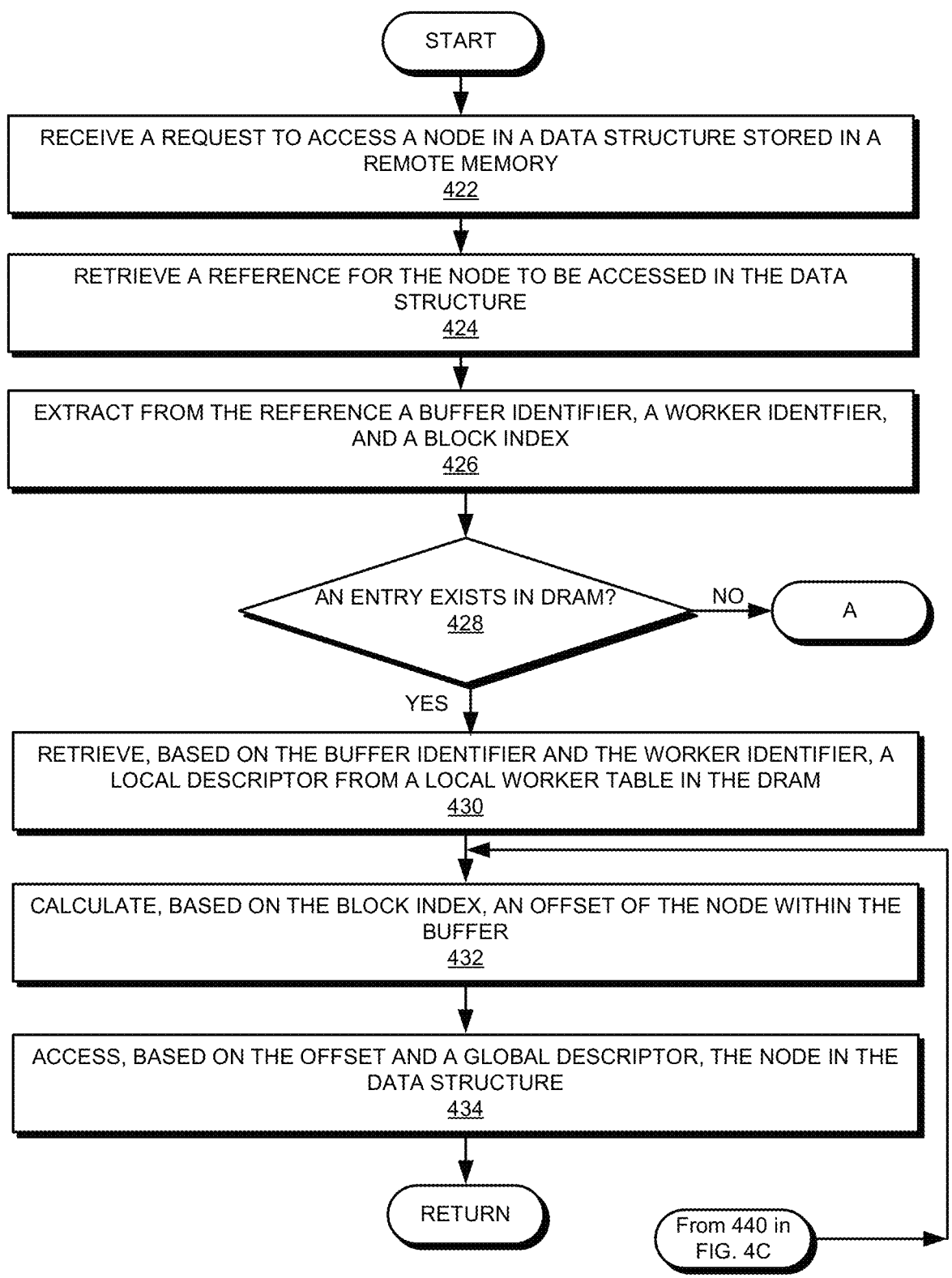
FIG. 4B presents a flowchart illustrating a sequence of operations involved while reading a node in a data structure, according to one embodiment of the present disclosure.
Figure 4C:
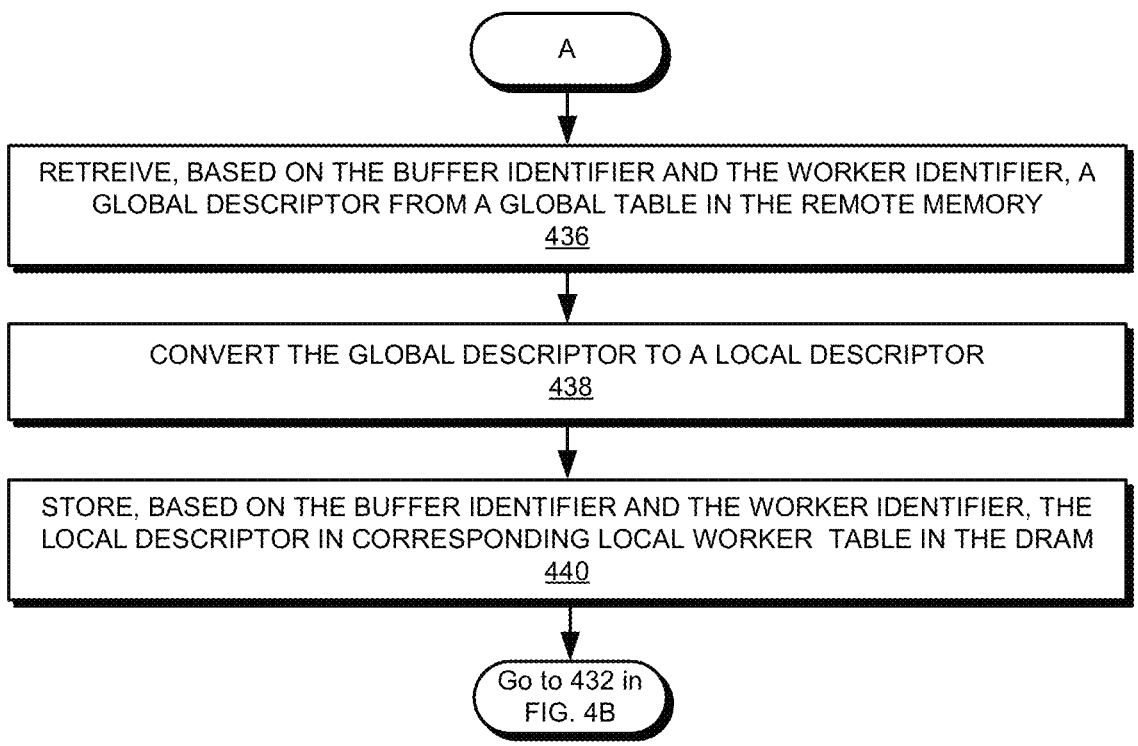
FIG. 4C presents a flowchart illustrating a sequence of operations involved while reading a node in a data structure, according to one embodiment of the present disclosure.

FIGS. 4B and 4C present a flowchart illustrating a sequence of operations involved while reading a node in a data structure, according to one embodiment of the present disclosure. During operation, the system may receive a request to access (e.g., a request to read) a node in a data structure in FAM (operation 422). Based on the request, the system may retrieve a handle or a reference for the node to be accessed in the data structure (operation 424) and extract from the reference a buffer identifier, a worker identifier, and a slot (or block) index associated with the data structure node (operation 426). The system may then determine, based on the three components extracted from the reference, whether an entry corresponding to the buffer identifier and the worker identifier exists in the local worker table in DRAM (operation 428).

In response to determining that an entry exists in DRAM, the system may then retrieve, based on the buffer identifier and the worker identifier, a local descriptor, i.e., a FD, from the local worker table in the DRAM associated with a compute node (operation 430). The system may then calculate, based on the block index, an offset value for the node within the buffer with FGD corresponding to the FD (operation 432). Based on the offset and the FGD, the system can then read the node in the data structure (operation 434) and the operation returns. In other words, given the local descriptor, the system can simply find a corresponding FGD in the shared global table in FAM and the apply the offset to the buffer to identify the node in the data structure.

In response to determining that no entry exists in the DRAM (operation 428 and label A), the system may retrieve, based on the buffer identifier and the worker identifier, a global descriptor, i.e., FGD, from the shared global table in FAM (operation 436 in FIG. 4C). When the requested data structure node is a valid node, the shared global table in FAM may have an entry for this node. The system may then convert the global descriptor to a local descriptor (operation 438 in FIG. 4C) and may store the local descriptor or the FD in a DRAM cache, i.e., a local worker table, associated with a compute node (operation 440 in FIG. 4C). The system may use this new entry in the local worker table for servicing subsequent access requests for any node from within the associated buffer, thereby facilitating faster traversals of the data structure. The system may then continue to operation 432 in FIG. 4B.

Exemplary Computer System and Apparatus

Figure 5:
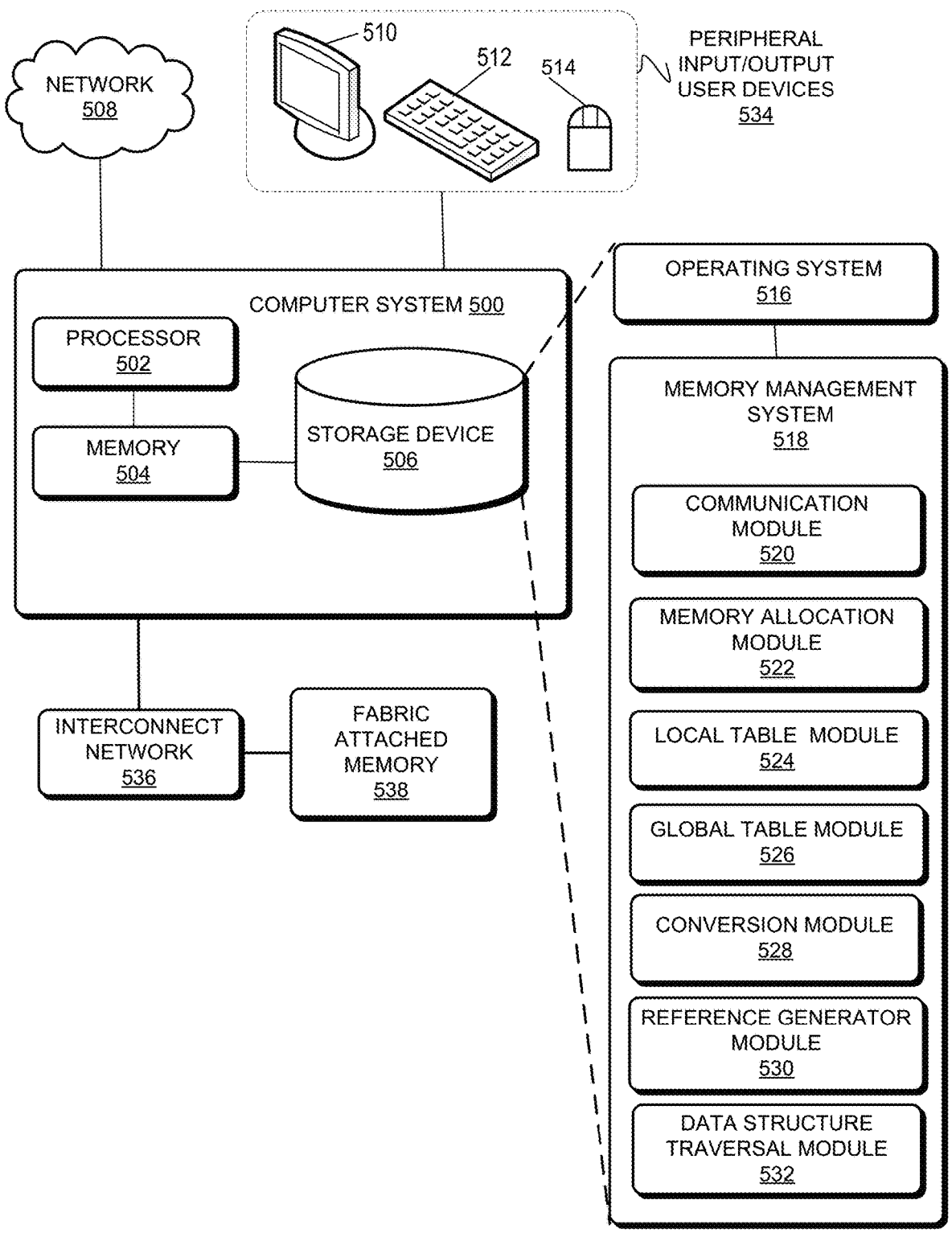
FIG. 5 illustrates an exemplary computer system for facilitating efficient management of data structures stored in FAM, according to one embodiment of the present disclosure.

FIG. 5 illustrates an exemplary computer system for facilitating efficient management of data structures stored in FAM, according to one embodiment of the present disclosure. In this example, computer system 500 can represent a compute node in an interconnect network. Computer system 500 can include one or more processors 502, a memory bank 504 (DRAMs), and a storage device 606. Computer system 500 can be coupled to peripheral input/output (I/O) user devices 534, e.g., a display device 510, a keyboard 512, and a pointing device 514, and can also be coupled via one or more network interfaces to network 508. Storage device 506 can store instructions for an operating system 516 and a memory management system 518. Computer system 500 can use a node controller to communicate with a fabric attached memory 538 via an interconnect network 536.

In one embodiment, memory management system 518 can include instructions, which when executed by processor(s) 502 can cause computer system 500 to perform methods and/or processes described in this disclosure. Memory management system 518 can include a communication module 520 for sending and/or receiving/obtaining data packets to/from other compute nodes across interconnect network 536 and for sending and/or receiving/obtaining data packets to/from FAM 538 via interconnect network 536. Memory management system 518 can further include instructions implementing a memory allocation module 522 for pre-allocating buffers within FAM for a worker process in computer system 500.

Memory management system 518 can include a local table module 524 for allocating memory space in memory 504 for a local worker table and for storing in the table a local descriptor corresponding to buffer(s) allocated in FAM 538. Memory management system 518 can also include a global table module 526 for allocating memory space for a shared global table in FAM and for storing in the table a global descriptor for every buffer allocated in FAM 538. Memory management system 518 can further include a conversion module 528 for performing conversions between global descriptor(s) in the shared global table and local descriptor(s) in the local worker table.

Memory management system 518 can further include instructions implementing a reference generator module 530 which can generate a handle for referencing the nodes in a data structure in FAM. The handle or the reference can include three components, i.e., a buffer identifier, a worker identifier, and a slot index. Memory management system 518 can further include a data structure traversal module 532 that can apply the handle and the global descriptor to traverse the data structure in FAM.

Figure 6:
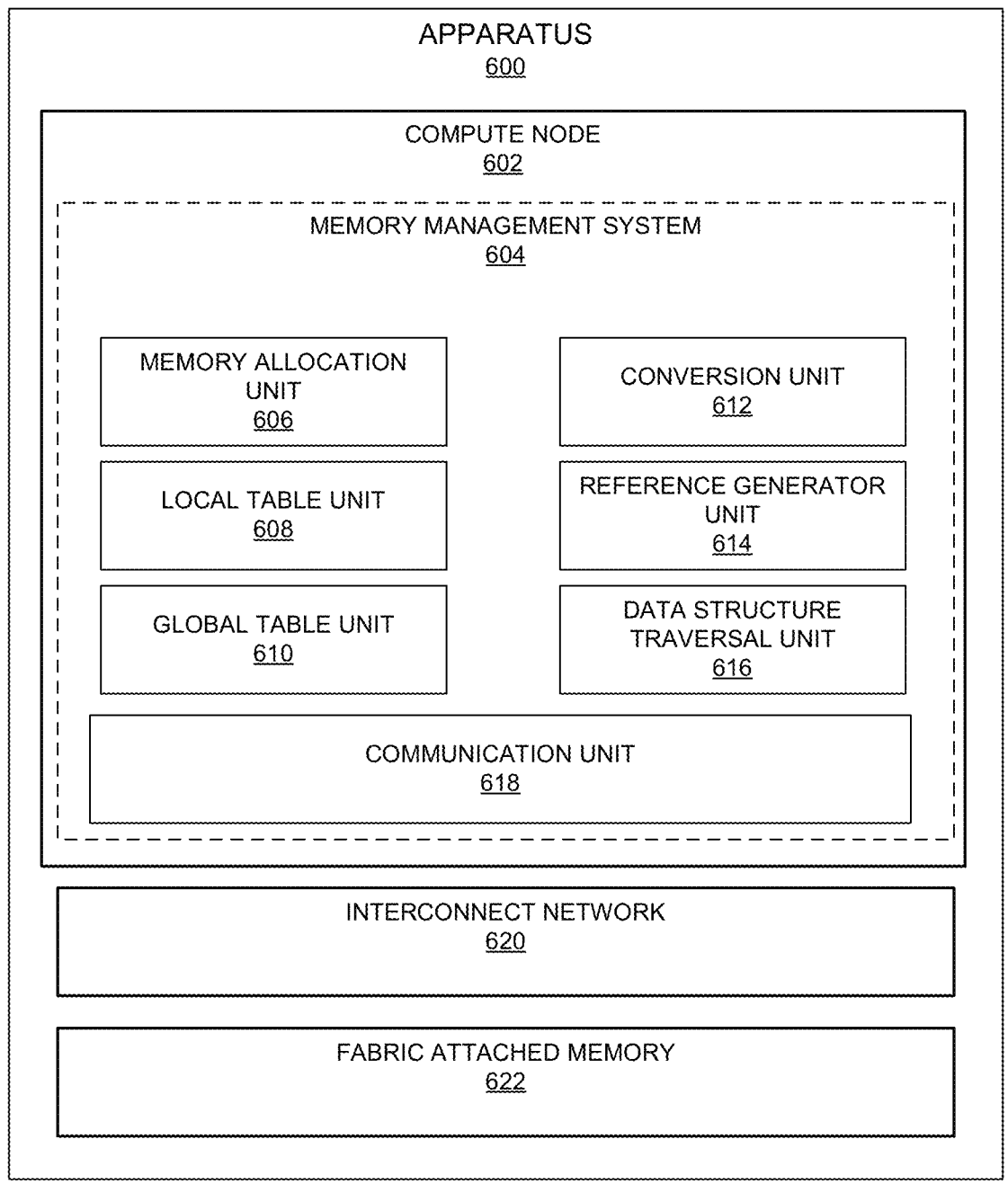
FIG. 6 illustrates an exemplary apparatus for facilitating efficient management of data structures stored in FAM, according to one embodiment of the present disclosure.

FIG. 6 illustrates an exemplary apparatus for facilitating efficient management of data structures stored in FAM, according to one embodiment of the present disclosure. Apparatus 600 can include a plurality of compute nodes, for simplicity only one compute node 602 is shown. Each compute node 602 can include a memory management system 604 which further includes units 606-618, which perform functions or operations similar to modules 520-532 of computer system 500 in FIG. 5, respectively. Apparatus 600 can include an interconnect network 620 and a fabric attached memory 622.

One embodiment can provide a system and method for facilitating efficient management of data structures stored in remote memory. During operation, the system can receive a request to allocate memory for a first part corresponding to a data structure in a remote memory associated with a compute node in a network. The system can pre-allocate a buffer in the remote memory for a plurality of parts in the data structure. The system can then store a first local descriptor associated with the buffer in a local worker table stored in the volatile memory. The first local descriptor can facilitate servicing future access requests to the first part and other parts in the data structure. Further, the system can store a first global descriptor, representing a memory location of the buffer, in a shared global table that is stored in the remote memory. The system can then generate a first reference corresponding to the first part, thereby facilitating faster traversals of the data structure.

In a variation on this embodiment, the system can a read access request associated with the first part in the data structure. The system can retrieve, based on the request, the first reference for the first part. In response to determining that an entry associated with the first reference exists in the local worker table: retrieving the first local descriptor from the local worker table; identifying, based on the first local descriptor, the first global descriptor in the global table; calculating, based on the first global descriptor and the first reference, an offset of the first part within the buffer; and reading, based on the offset and the first reference, the first part from the data structure.

In a variation on this embodiment, the system can receive a read access request associated with a second part in the data structure. The system can retrieve, based on the request, a second reference for the second part. In response to determining that an entry associated with the second reference does not exist in the local worker table: retrieving, based on the second reference, a second global descriptor from the global table; converting the second global descriptor to a second local descriptor; storing the second local descriptor in the local worker table; calculating, based on the second reference and the second global descriptor, an offset of the second part within a corresponding buffer; and reading, based on the offset and the second reference, the second part from the data structure.

In a variation on this embodiment the global table is a two-dimensional array with rows indexed by a buffer identifier and the columns indexed by a worker process identifier.

In a variation on this embodiment, the global table facilitates concurrent accesses to the data structure from multiple worker processes associated with respective compute nodes in the network.

In a variation on this embodiment, the network includes a plurality of compute nodes with each compute node associated with a local worker table corresponding to a worker process; wherein the local worker table is a two-dimensional array with the rows indexed by a buffer identifier and the columns indexed by a worker identifier, and wherein the volatile memory is a dynamic random access memory.

In a variation on this embodiment, the first reference represents a pointer to the first part in the data structure and the first reference includes: a buffer identifier; a worker identifier; and an index representing a memory block number within the buffer.

In a variation on this embodiment, the buffer includes a plurality of memory blocks representing different nodes in the data structure; and wherein the global table and the data structure are stored in the remote memory.

In a further variation, the remote memory is a persistent fabric attached memory.

In a further variation, the first reference is 64-bit in length and enables 64-bit atomic operations.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method of a system comprising a hardware processor, comprising:
    receiving, from a first worker process in a first compute node in a network, a request to allocate memory for a first part in a data structure stored in a remote memory;
    pre-allocating a buffer in the remote memory for a plurality of parts in the data structure;
    storing a first local descriptor associated with the buffer in a first local worker table stored in a volatile memory of the first compute node, wherein the first local descriptor comprises a local address of the buffer useable by the first compute node, wherein the network includes a plurality of compute nodes with each compute node associated with a local worker table corresponding to a worker process, and wherein the local worker table associated with each compute node is a two-dimensional array comprising entries indexed by a buffer identifier and by a worker identifier;
    storing a first global descriptor, representing a memory location of the buffer in the remote memory, in a shared global table that is stored in the remote memory;
    allocating a memory block in the buffer for the first part;
    generating a first reference corresponding to the first part, the first reference comprising a worker identifier that identifies the first worker process and a buffer identifier that identifies the buffer;
    in response to a read access request to access the first part, retrieving the first reference corresponding to the first part;
    determining whether the first local worker table contains an entry for the worker identifier and the buffer identifier in the retrieved first reference; and
    in response to determining that the first local worker table contains the entry for the worker identifier and the buffer identifier in the retrieved first reference, using the first local descriptor in the entry to access the first part in the data structure.

2. The method of claim 1, further comprising:
in response to determining that the first local worker table contains the entry for the worker identifier and the buffer identifier in the retrieved first reference:
retrieving the first local descriptor from the first local worker table;
identifying, based on the first local descriptor, the first global descriptor in the shared global table;
calculating, based on the first global descriptor and the first reference, an offset of the first part within the buffer; and
reading, based on the offset and the first reference, the first part from the data structure.

3. The method of claim 1, further comprising:
receiving a further read access request to access a second part in the data structure;
retrieving, based on the further read access request, a second reference for the second part;
in response to determining that an entry associated with the second reference does not exist in the first local worker table:
retrieving, based on the second reference, a second global descriptor from the shared global table;
converting the second global descriptor to a second local descriptor;
storing the second local descriptor in the first local worker table;
calculating, based on the second reference and the second global descriptor, an offset of the second part within a corresponding buffer in the remote memory; and
reading, based on the offset and the second reference, the second part from the data structure.

4. The method of claim 1, wherein the shared global table is a two-dimensional array with rows indexed by a buffer identifier and columns indexed by a worker process identifier.

5. The method of claim 1, wherein the shared global table facilitates concurrent accesses to the data structure from multiple worker processes associated with the plurality of compute nodes in the network, wherein the plurality of compute nodes include the first compute node and a second compute node, the second compute node storing a second local descriptor associated with the buffer in a second local worker table stored in a volatile memory of the second compute node, and wherein the second local descriptor associated with the buffer is different from the first local descriptor associated with the buffer.

6. The method of claim 1, wherein the two-dimensional array of the local worker table associated with each compute node has rows indexed by a buffer identifier and columns indexed by a worker identifier.

7. The method of claim 1, wherein the first reference represents a pointer to the first part in the data structure, and the first reference further comprises an index representing a memory block number within the buffer.

8. The method of claim 1, wherein the data structure is a tree structure, and wherein the buffer includes a plurality of memory blocks representing different nodes of the tree structure.

9. The method of claim 1, wherein the remote memory is a persistent fabric attached memory.

10. The method of claim 1, wherein the first reference is 64 bits in length and enables 64-bit atomic operations.

11. A system comprising:
a plurality of compute nodes, wherein a first compute node of the plurality of compute nodes comprises:
a processor;
a memory; and
a non-transitory storage medium storing instructions executable on the processor to:
store a first local descriptor associated with a buffer in a first local worker table stored in the memory of the first compute node, wherein the first local descriptor in the first local worker table comprises a local address of the buffer useable by the first compute node in accessing a first part of a plurality of parts of a data structure, wherein the buffer is pre-allocated in a remote memory that is accessible over a network, and an allocation of a block for the first part in the buffer in the remote memory is responsive to an allocation request from a first worker process in the first compute node, wherein the remote memory further stores a shared global table containing a first global descriptor representing a memory location of the buffer in the remote memory, wherein each compute node of the plurality of compute nodes is associated with a local worker table corresponding to a worker process, and wherein the local worker table associated with each compute node is a two-dimensional array with rows indexed by a buffer identifier and columns indexed by a worker identifier;
in response to a read access request to access the first part of the data structure in the remote memory, retrieve a first reference corresponding to the first part, wherein the first reference comprises a worker identifier that identifies the first worker process that sent the allocation request and a buffer identifier that identifies the buffer;
determine whether the first local worker table contains an entry for the worker identifier and the buffer identifier in the retrieved first reference; and
in response to determining that the first local worker table contains the entry for the worker identifier and the buffer identifier in the retrieved first reference, use the first local descriptor in the entry to access the first part in the data structure in the remote memory.

12. The system of claim 11, wherein the instructions are executable on the processor to in response to determining that the first local worker table contains the entry for the worker identifier and the buffer identifier in the retrieved first reference:
retrieve the first local descriptor from the first local worker table;
identify, based on the first local descriptor, the first global descriptor in the shared global table;
calculate, based on the first global descriptor and the first reference, an offset of the first part within the buffer; and
read, based on the offset and the first reference, the first part from the data structure.

13. The system of claim 11, wherein the shared global table is a two-dimensional array with rows indexed by a buffer identifier and columns indexed by a worker process identifier, and the system comprises:
a management system to pre-allocate the buffer in the remote memory, and allocate the block in the buffer responsive to the allocation request from the first worker process in the first compute node.

14. The system of claim 11, wherein the plurality of compute nodes includes the first compute node and a second compute node, the second compute node storing a second local descriptor associated with the buffer in a second local worker table stored in a volatile memory of the second compute node, wherein the shared global table facilitates concurrent accesses to the data structure from multiple worker processes associated with respective compute nodes of the plurality of compute nodes, and wherein the second local descriptor associated with the buffer is different from the first local descriptor associated with the buffer.

15. The system of claim 11, wherein the first reference represents a pointer to the first part in the data structure, and the first reference further comprises an index representing a memory block number within the buffer.

16. The system of claim 11, wherein the buffer includes a plurality of memory blocks representing different parts of the data structure.

17. A non-transitory machine-readable storage medium comprising instructions that upon execution cause a system to:
- receive, from a first worker process in a first compute node in a network, a request to allocate memory for a first part in a data structure stored in a remote memory;
- pre-allocate a buffer in the remote memory for a plurality of parts in the data structure;
- store a first local descriptor associated with the buffer in a first local worker table stored in a memory of the first compute node, wherein the first local descriptor comprises a local address of the buffer useable by the first compute node, wherein the network includes a plurality of compute nodes with each compute node associated with a local worker table corresponding to a worker process, and wherein the local worker table associated with each compute node is a two-dimensional array comprising entries indexed by a buffer identifier and by a worker identifier;
- store a first global descriptor, representing a memory location of the buffer in the remote memory, in a shared global table that is stored in the remote memory;
- allocate, in response to the request from the first worker process, a memory block in the buffer for the first part;
- generate a first reference corresponding to the first part, the first reference comprising a worker identifier that identifies the worker process that sent the request and a buffer identifier that identifies the buffer;
- in response to a read access request to access the first part, retrieve the first reference corresponding to the first part;
- determine whether the first local worker table contains an entry for the worker identifier and the buffer identifier in the retrieved first reference; and
- in response to determining that the first local worker table contains the entry for the worker identifier and the buffer identifier in the retrieved first reference, use the first local descriptor in the entry to access the first part in the data structure in the remote memory.

18. The non-transitory machine-readable storage medium of claim 17, wherein the instructions upon execution cause the system to:
- in response to determining that the first local worker table contains the entry for the worker identifier and the buffer identifier in the retrieved first reference:
  - retrieve the first local descriptor from the first local worker table;
  - identify, based on the first local descriptor, the first global descriptor in the shared global table;
  - calculate, based on the first global descriptor and the first reference, an offset of the first part within the buffer; and
  - read, based on the offset and the first reference, the first part from the data structure.

19. The non-transitory machine-readable storage medium of claim 17, wherein the data structure comprises a tree structure, and the plurality of parts comprises a plurality of nodes of the tree structure.

* * * * *